US008496562B2

(12) United States Patent
Arnold et al.

(10) Patent No.: US 8,496,562 B2
(45) Date of Patent: Jul. 30, 2013

(54) METHOD FOR THE OPERATION OF A TRANSMISSION DEVICE

(75) Inventors: Jorg Arnold, Immenstaad (DE); Klaus Steinhauser, Kressbronn (DE); Valentine Herbeth, Friedrichshafen (DE); Christian Popp, Kressbronn (DE); Thilo Schmidt, Meckenbeuren (DE); Peter Ziemer, Tettnang (DE); Gabor Diosi, Friedrichshafen (DE); Christoph Margraf, Salem (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 82 days.

(21) Appl. No.: 13/140,032

(22) PCT Filed: Jan. 13, 2010

(86) PCT No.: PCT/EP2010/050341
§ 371 (c)(1),
(2), (4) Date: Jun. 16, 2011

(87) PCT Pub. No.: WO2010/081819
PCT Pub. Date: Jul. 22, 2010

(65) Prior Publication Data
US 2011/0263382 A1    Oct. 27, 2011

(30) Foreign Application Priority Data
Jan. 15, 2009 (DE) .................. 10 2009 000 253

(51) Int. Cl.
*F16H 61/26* (2006.01)
*B60W 10/08* (2006.01)
(52) U.S. Cl.
USPC .......................................... 477/131; 477/111
(58) Field of Classification Search
USPC ....................................................... 475/303
See application file for complete search history.

(56) References Cited

U.S. PATENT DOCUMENTS

| | | | | |
|---|---|---|---|---|
| 6,176,811 B1 * | 1/2001 | Popp et al. | | 477/115 |
| 6,413,189 B1 * | 7/2002 | Spiess et al. | | 477/110 |
| 6,440,031 B1 | 8/2002 | Eberspacher et al. | | |
| 7,682,281 B2 * | 3/2010 | Ziemer | | 475/275 |
| 8,038,564 B2 * | 10/2011 | Earhart et al. | | 475/218 |
| 2007/0287591 A1 * | 12/2007 | Steinhauser et al. | | 477/121 |
| 2008/0228431 A1 | 9/2008 | Guggolz et al. | | |

FOREIGN PATENT DOCUMENTS

| | | |
|---|---|---|
| DE | 198 14 569 A1 | 10/1999 |
| DE | 199 39 819 C1 | 11/2000 |
| DE | 102 43 278 A1 | 3/2004 |
| DE | 10 2004 014 081 A1 | 10/2005 |
| DE | 10 2005 032 225 B3 | 8/2006 |
| EP | 1 995 499 A1 | 11/1998 |
| EP | 1 705 406 A1 | 9/2006 |

\* cited by examiner

*Primary Examiner* — David D Le
*Assistant Examiner* — Mark Manley
(74) *Attorney, Agent, or Firm* — Davis & Bujold, PLLC (57) ABSTRACT

A method is described for the operation of a transmission device (1) with a plurality of frictional shift elements (A, D, E, F) and at least one interlocking shift element (B, C) for obtaining various gear ratios. When a command is received for a gearshift during which the interlocking shift element (C) has to be changed from an open to a closed operating condition, the interlocking shift element (C) is at least approximately synchronized by increasing the transmission capacity of at least one frictional shift element (A) which does not have to be engaged in the force flow either to obtain the gear ratio that is to be disengaged or to obtain the gear ratio that is to be engaged.

12 Claims, 4 Drawing Sheets

(PRIOR ART) Fig. 1

| Gear | C | F | E | D | A | B |
|------|---|---|---|---|---|---|
| "1"  | X |   |   | X |   | X |
| "2"  | X |   | X |   |   | X |
| "3"  | X | X |   |   |   | X |
| "4"  | X |   |   |   | X | X |
| "5"  | X | X |   |   | X |   |
| "6"  | X |   | X |   | X |   |
| "7"  | X |   |   | X | X |   |
| "8"  |   |   | X | X | X |   |
| "9"  |   | X |   | X | X |   |
| "R"  |   | X |   | X |   | X |

# METHOD FOR THE OPERATION OF A TRANSMISSION DEVICE

This application is a National Stage completion of PCT/EP2010/050341 filed Jan. 13, 2010, which claims priority from German patent application serial no. 10 2009 000 253.7 filed Jan. 15, 2009.

FIELD OF THE INVENTION

The invention concerns a method for operating a transmission device.

BACKGROUND OF THE INVENTION

Transmission devices known from practice and designed as automatic transmissions are constructed with shift elements for producing various gear ratios, by means of which a respective applied torque can be transmitted by friction. When the engagement of a defined gear ratio is called for, in each case one or more of the frictional shift elements is disengaged from the force flow of the transmission device, while at least one or more further frictional shift elements are engaged in the force flow of the transmission device in order to produce the gear ratio required. During the process of engaging a frictional shift element no special synchronization measures are necessary to ensure desired shifting comfort and a shift without any traction force interruption, since a desirable shift comfort level and a shift without traction force interruption can be achieved by frictional shift elements at defined contact pressures within a wide range of rotational speed differences.

In a manner known per se, since such transmission devices can only be operated with insufficient efficiencies because of drag losses that occur in the area of open frictional shift elements, certain frictional shift elements are replaced by interlocking shift elements. In such automatic transmissions made with both frictional shift elements and at least one interlocking shift element and with a corresponding gearset configuration, to carry out a defined shift command at least one interlocking shift element has to be engaged in the force flow of the transmission device.

Disadvantageously, compared with frictional shift elements interlocking shift elements with or without additional practical synchronization means can only be shifted comfortably when the speed differences are very small, i.e. close to their synchronization speed, so that the operation of a transmission device made with at least one interlocking shift element and designed as an automatic transmission is impaired to an undesired extent, at least when carrying out certain shifts in which an interlocking shift element is involved. A required shift can sometimes only be completed after the passage of an undesirably long shifting time, since before the interlocking shift element involved in the required shift can close, the speed difference in the area of the interlocking shift elements has to be adjusted to a value at which the interlocking shift element can be changed to its closed operating condition. Furthermore, in the area of an interlocking shift element no load transfer of the type that occurs with a frictional shift element is possible before reaching the closed operating condition, so shifts with interlocking shift elements cannot be carried out without interruption of the traction force.

However, additional design measures for synchronizing interlocking shift elements of transmission devices in order to enable shifts to be carried out without traction force interruption within an acceptable shifting time and with a high level of shifting comfort, increase to an undesirable extent both the manufacturing costs of the transmission devices and the structural fitting space that they occupy.

SUMMARY OF THE INVENTION

Accordingly, the purpose of the present invention is to provide a method for the operation of a transmission device, by means of which shifts in transmission devices involving at least one interlocking shift element can be carried out with a high level of shifting comfort, inexpensively, and without the need for additional structural fitting space of a transmission device, within predefined shifting times and preferably without traction force interruption.

In the method according to the invention for operating a transmission device with a plurality of frictional shift elements and at least one interlocking shift element for producing various gear ratios, when a shift is called for, during which the interlocking shift element has to be changed from a disengaged to an engaged operating condition, the interlocking shift element is at least approximately synchronized by increasing the transmission capacity of at least one frictional shift element which does not need to be connected into the force flow of the transmission device either to maintain the current operating condition of the transmission device or to produce the gear ratio to be engaged therein.

Thus, without additional structural synchronization means, the at least one interlocking shift element is synchronized before its engaging process during a required shift, effectively, inexpensively and with little fitting space requirement of the transmission device, by appropriate operation of devices already present in a transmission device, namely in this case at least one frictional shift element, so that shifts can be carried out with a high level of shifting comfort, along with acceptable shifting times and preferably without traction force interruption.

In an advantageous variant of the method according to the invention, the interlocking shift element is changed to its engaged condition in an at least approximately synchronized operating state, so that greater shifting comfort along with low mechanical loads in the area of the interlocking shift element are achieved.

In a further advantageous variant of the method according to the invention the loads on individual assemblies of a transmission device are reduced, along with a high level of shifting comfort, in that the transmission capacity of a further frictional shift element, which is neither involved in the synchronization process of the interlocking shift element, nor in maintaining the current operating condition of the transmission device nor in producing the gear ratio to be engaged, is increased before synchronization of the interlocking shift element is brought about by increasing the transmission capacity of the frictional shift element, and a drive output actively connected to a transmission output of a vehicle constructed with a transmission device is braked.

When reversing the vehicle constructed with the transmission device at a vehicle speed higher than a predefined threshold value, in a neutral operating condition of the transmission device in which the force flow in the transmission device is essentially interrupted, and when a command has been given to engage a gear ratio for forward driving in the transmission device, to obtain which the interlocking shift element has to be changed to an engaged operating condition, in a further advantageous variant of the method according to the invention the transmission output actively connected to the drive output is braked by increasing the transmission capacity of the further frictional shift element, in order to be able to carry out the required shift with great shifting comfort along with low mechanical loads in the area of the interlocking shift element.

By virtue of a further variant of the method according to the invention, a required shift, during which an interlocking shift element has to be connected into the force flow of a transmission device, is carried out with great shifting comfort along with low mechanical loads in the area of the interlocking shift element if, during forward driving of a vehicle constructed with the transmission device and when the vehicle speed is lower than a predefined threshold value, in a neutral operating condition of the transmission device in which the force flow in the transmission device is essentially interrupted, and when a command is given to engage a forward driving gear in the transmission device, to obtain which the interlocking shift element has to be changed to an engaged operating condition, the interlocking shift element is at least approximately synchronized by increasing the transmission capacity of a frictional shift element whose transmission capacity during the production of the required gear ratio is essentially zero, and is then engaged, and thereafter, a frictional shift element which produces the force flow in the transmission device is engaged.

While reversing at a vehicle speed lower than the threshold value the interlocking shift element is at least approximately synchronized by increasing the transmission capacity of the frictional shift element and is then engaged, and in a further advantageous variant of the method according to the invention, in turn after that a frictional shift element which produces the force flow in the transmission device is engaged, in order to be able to carry out the required shift with great comfort along with low mechanical loads in the area of the interlocking shift element.

In a further advantageous variant of the method according to the invention, if a traction upshift preferably without traction force interruption has been called for, during which the interlocking shift element has to be engaged in order to obtain the required gear ratio, the interlocking shift element is at least approximately synchronized before being engaged by increasing the transmission capacity of at least one frictional shift element which neither has to be engaged in the force flow of the transmission device to maintain the current operating condition in the transmission device nor to obtain the required operating condition therein.

In a further advantageous variant of the method according to the invention, when the transmission input speed corresponds at least approximately to a synchronous speed that is equivalent to the required target gear ratio, the transmission capacity of the frictional shift element engaged in order to obtain the current gear ratio is reduced while the interlocking shift element to be engaged is changed to its engaged operating condition.

In a further advantageous variant of the method according to the invention, a required traction upshift can be carried out without traction force interruption in that when the command is received for the traction upshift starting from the current gear ratio toward the target ratio, the transmission capacity of a frictional shift element engaged in the force flow in order to obtain the current gear ratio is reduced, and the frictional shift element provided for synchronizing the interlocking shift element to be engaged is at least approximately prepared for an increase of its transmission capacity.

In a further advantageous variant of the method according to the invention, the transmission capacity of the frictional shift element engaged in order to obtain the current gear ratio is reduced approximately to zero when, owing to the transmission capacity of the frictional shift element provided for synchronizing the interlocking shift element to be engaged, the transmission input speed moves from the speed equivalent to the current gear ratio toward the speed equivalent to the target gear ratio. In a simple manner this ensures that a traction upshift required can be carried out without traction force interruption along with a high shifting comfort level.

Both the characteristics indicated in the claims and those indicated in the example embodiments of the object of the invention described below are in each case, whether in themselves or in any desired combination with one another, suitable for further development of the object. In relation to the further development of the object of the invention, the respective combinations of characteristics do not imply any limitation, but are presented solely as examples.

BRIEF DESCRIPTION OF THE DRAWINGS

Further advantages and advantageous embodiments of the object of the invention emerge from the claims and from the example embodiments whose principle is described below with reference to the drawings, in which, for the sake of clarity, the same indexes are used for components having the same structure and function when describing the various example embodiments.

The drawing shows.

DETAILED DESCRIPTION OF THE PREFERRED EMBODIMENTS

Figure 1:
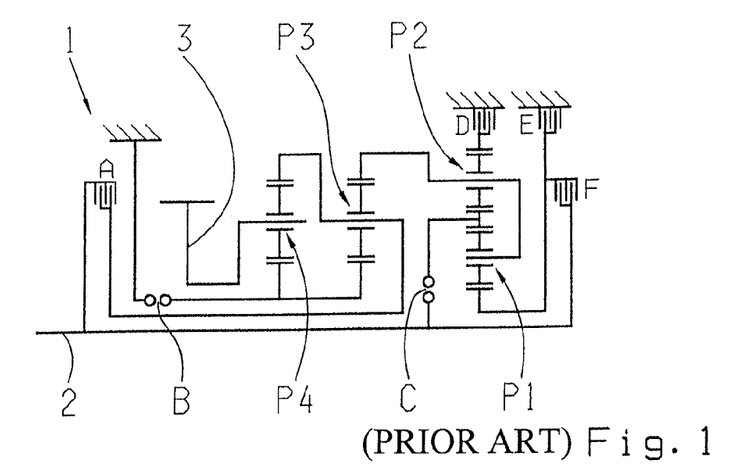
FIG. 1: Gear layout of a transmission device.

FIG. 1 shows a gear layout of a transmission device 1 or multi-step transmission, basically known from the unpublished German Patent Application DE 10 2008 000 429.4 by the present applicant. The transmission device comprises a drive input shaft 2 and a drive output shaft 3, the latter, when in its condition mounted in a vehicle, being connected to a drive output of the vehicle, whereas the driveshaft 2 is actively connected to a drive machine.

Moreover, the transmission device 1 comprises four planetary gearsets P1 to P4, such that the first and second planetary gearsets P1, P2, which are preferably designed as minus planetary gearsets, form a shiftable upstream gearset whereas the third and fourth planetary gearsets P3, P4 constitute the main gearset. In addition the transmission device 1 comprises six shift elements A to F of which the shift elements B, D and E are brakes and the shift elements A, C and F are designed as shift clutches.

With the shift elements A to F, nine forward gears "1" to "9" and one reverse gear "R" can be engaged selectively, such that up to the fourth gear ratio step "4", to obtain a gear ratio in the transmission device 1 or to produce a force flow therein, in each case three shift elements at the same time have to be changed to an engaged operating condition or maintained in it.

In this case, the shift elements B and C are interlocking shift elements in order to, during operation of the transmission device 1, reduce drag losses caused by disengaged frictional shift elements compared with transmission devices made using only frictional shift elements. Since in general interlocking shift elements can only be changed from a disengaged to an engaged operating condition within a very narrow rotational speed difference range around the synchronous speed, the synchronization of an interlocking shift element to be engaged without additional design expedients is assisted by means of the method according to the invention described in more detail below, or is indeed fully realized by the procedure according to the invention. The method described below is suitable for both traction and coasting gearshifts, while the interlocking shift elements can be in the form of claw clutches designed with or without additional synchronizing means.

Figure 3:
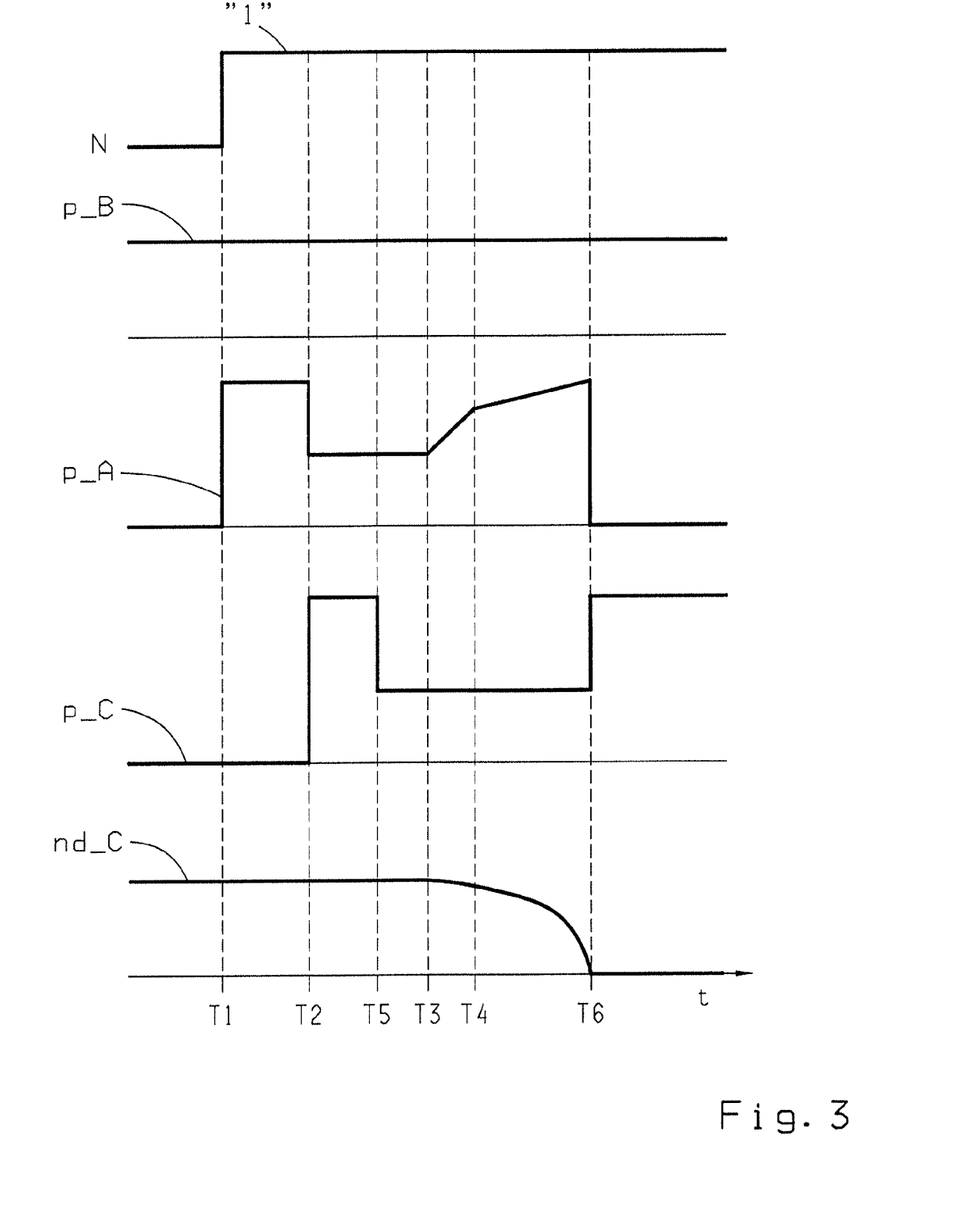
FIG. 3: Variations of various operating condition parameters of the transmission device in FIG. 1 while carrying out a required shift.

The mode of action of a first variant of the method according to the invention is explained in more detail with reference to the operating condition variations of a number of operating parameters of the transmission device 1 of FIG. 1, shown in detail in FIG. 3 as functions of the time t.

Up to a time T1 the transmission device 1 is in a so-termed neutral operating condition N in which, essentially, no torque can be transmitted by the transmission device 1 from the drive input shaft 2 to the drive output shaft 3 or in the opposite direction. At time T1 a shift command is given to engage the first gear ratio step "1" for forward driving, to obtain which the shift elements C, D and B have to be changed to the engaged operating condition.

To increase spontaneity the shift element B is already in its engaged condition in the neutral operating condition N of the transmission device 1 even without a corresponding shift command, and is held there by an actuation pressure p_B. The shift element B is also involved in producing the gear ratio "R" for driving in reverse, so that when a corresponding shift command arrives to shift from the neutral operating condition to the starting or first forward-driving gear ratio "1" or to the gear ratio "R" for reversing, in each case this can be carried out with a short shifting time. This results from the fact that in those cases, respectively, only the shift elements C and D or the shift elements D and F have to be engaged.

To carry out the shift command from the neutral operating condition N to the first gear ratio step "1" for forward driving, the further interlocking shift element C is first closed, but when the shift element B is engaged at the same time and the further frictional shift element D is, again at the same time, in it the open operating condition, the force flow in the transmission device 1 has not yet been formed. Thereafter, the frictional shift element D is engaged or changed to its closed operating condition. The shifting process from the neutral operating condition N to the first gear ratio step "1" has then been completed.

To synchronize the interlocking shift element C before it is actually closed, the actuating pressure p_A of the frictional shift element A is acted upon at the actuating pressure p_A during a pressure pulse that lasts until a second time T2 and is then further supplied with pressure at a low pressure level p_A1 until a further time T3, so that a piston of the frictional shift element A contacts a disk packet (not shown) of the shift element A. From time T3 the actuating pressure p_A of the shift element A is increased along a pressure ramp which ends at a time T4, so that the transmission capacity of the shift element A increases and a speed difference nd_C in the area of the interlocking shift element C to be closed decreases slowly as shown in FIG. 3. This means that by increasing the transmission capacity of the shift element A, the shift element C is moved in the direction of its synchronous point.

At the same time, from time T2 during a rapid-filling phase that lasts until a time T5 and a following filling adjustment phase that extends in time to a point T6, the shift element C is prepared for engagement into the force flow of the transmission device 1. At time T6 the shift element C is in an at least approximately synchronous operating condition, in which a further increase of the actuating pressure p_C results in closing of the shift element C.

Between times T4 and T6 the actuating pressure p_A of the shift element A is increased further on a flatter pressure ramp than between time T3 and T4, in order to bring the speed difference nd_C of the shift element C as close as possible to zero and to synchronize the interlocking shift element C harmoniously. Since the speed difference nd_C of the shift element C at time T6 is at least approximately equal to zero, the actuating pressure p_C of the shift element C is abruptly increased at time T6 and the shift element C is closed promptly, whereas the actuating pressure p_A of the shift element A, which is not involved in obtaining the first gear ratio step "1" for forward driving in the transmission device 1, is reduced abruptly to at least approximately zero. Thereby the shift element A reverts to its open operating condition in which essentially no torque can be transmitted by the shift element A. This means that the engagement process of the interlocking shift element C ends at time T6 and the further frictional shift element D that produces the force linkage through the transmission device 1 can be engaged in the force flow of the transmission device 1 by appropriately increasing the actuating pressure of the frictional shift element D.

During this, depending on the application concerned the possibility exists of preparing the shift element D for its engagement by appropriate control of its actuating pressure, already before the engagement time T6 of the interlocking shift element C.

Figure 4:
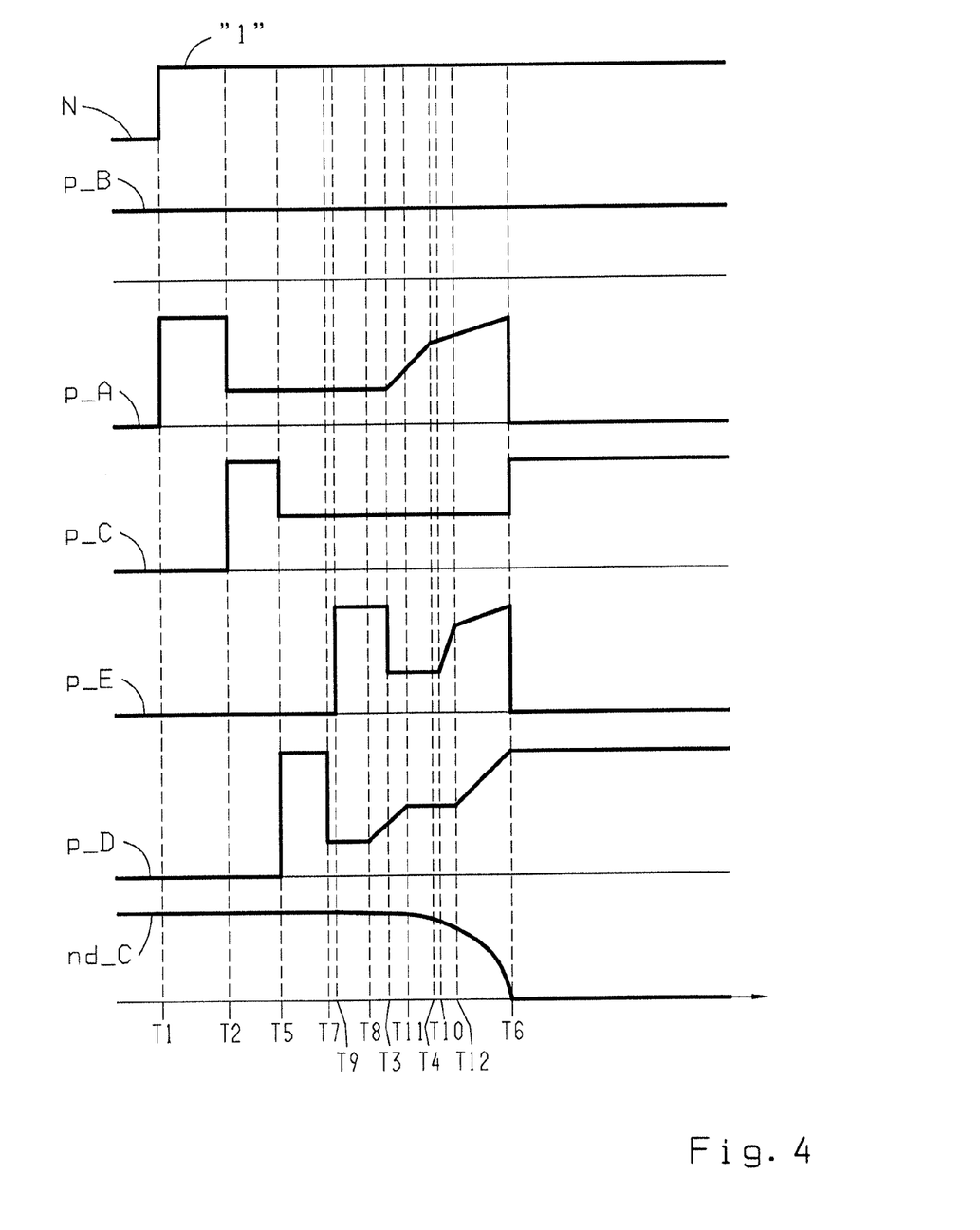
FIG. 4: Representation as in FIG. 3 of various operating parameter variations during an operating condition variation of the transmission device according to FIG. 1 comprising a further shift.

The operating condition variations of the transmission device 1 shown in FIG. 4 take place if a further variant of the method according to the invention is used, which compared with the procedure described above, provides an additional functionality.

The variations of the operating parameters of the transmission device 1 take place during a shift operation, starting from an operating point at which the transmission device 1 is in the neutral operating condition and a vehicle with the transmission device 1 is rolling in the reverse driving direction. At time T1, again, a shift command is given to engage the first gear ratio step "1" for forward driving in the transmission device 1. Since the vehicle is moving in reverse, in this second variant of the method according to the invention, before the actual synchronization process of the interlocking shift element C by the frictional shift element A the vehicle is braked by a defined braking of the drive output shaft 3 in the manner described in more detail below.

For this, in the manner described earlier the frictional shift element A is prepared between times T1 and T3 for the transmission capacity of the frictional shift element A to be increased. At the same time the actuating pressure p_C of the shift element C is adjusted between times T2 and T6 as described in relation to FIG. 3 and the shift element C is prepared for engagement in the force flow of the transmission device 1. From time T5 the actuating pressure p_D of the frictional brake or shift element D is pre-filled by a rapid-filling pulse until a time T7 and prepared for increasing the transmission capacity of the shift element D during a filling adjustment phase which ends at a time T8.

At a time T9 which follows shortly after time T7, the actuating pressure p_E of the shift element E is also pre-filled by a rapid-filling pulse in this case ending at time T3 and prepared during a subsequent filling adjustment phase that ends at a time T10 for increasing the transmission capacity of the shift element E.

The shift element B, which in order to increase spontaneity is in the closed operating condition when the transmission device 1 is in its neutral operating condition, is acted upon throughout the operating condition variation with a value of its control pressure p_B at which the frictional shift element B is held in the fully closed condition.

Beginning at time T8 the actuating pressure p_D of the shift element D is increased along a first pressure ramp that ends at time T11, and is kept at the pressure level reached at time T11 until a further time T12. At the same time the actuating pressure p_E of the shift element E is increased, beginning at time T10, along a first pressure ramp which also ends at time T12, so that torque can be transmitted by both of the shift elements D and E. The increase of the transmission capacities of shift elements D and E leads to a redundancy of the transmission gearset of the transmission device 1 and hence to a defined braking of the drive output shaft 3 and of the vehicle.

From time T12 both the actuating pressure p_D of the shift element D and the actuating pressure p_E of the shift element E are increased along a second pressure ramp until time T6, and the vehicle is braked further.

In addition, in the manner described earlier the increase of the actuating pressure p_A of the shift element A between times T3 and T6 leads to a reduction of the speed difference nd_C of the shift element C, whereby at time T6 the speed difference nd_C of the shift element C is at least approximately zero. At time T6, by increasing the actuating pressure p_C the shift element C is closed, while the frictional shift element A is changed to its open operating condition by abruptly reducing its actuating pressure p_A. At the same time the shift element E, which is also not involved in obtaining the first gear ratio step "1", is changed to its open operating condition by abruptly reducing the actuating pressure p_E.

The actuating pressure p_D of the shift element D involved in obtaining the first gear ratio step "1" is held at the pressure level of the actuating pressure p_D at time T6, which corresponds essentially to the closing pressure of the shift element D, so that the required shift can be regarded as ended at time T6.

Below, with reference to further operating parameter variations shown in FIG. 5 a further variant of the method according to the invention is described, which is carried out during a traction upshift in a transmission device 1 of different design compared with the transmission device in FIG. 1, such that in this second version (not shown in the drawing) of the transmission device 1 the shift element E is in the form of an interlocking shift element which has to be shifted to a closed operating condition in order to obtain the target gear ratio required for the traction upshift.

Figure 2:
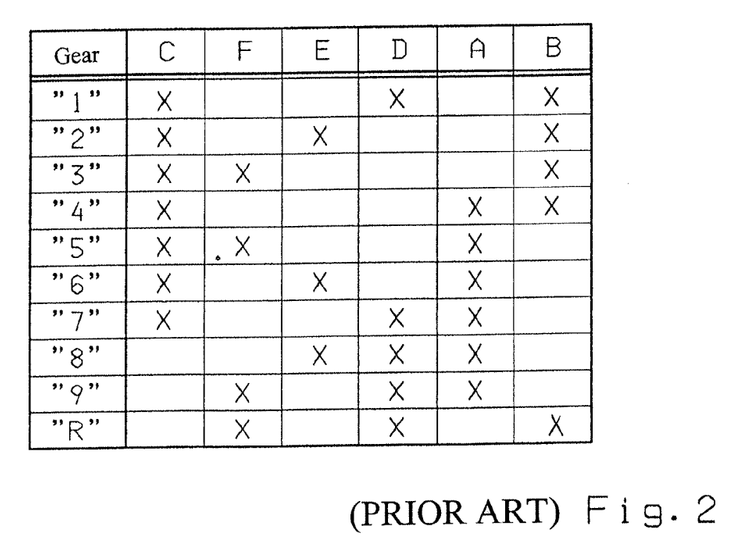
FIG. 2: Shifting scheme of the transmission device in FIG. 1, in tabular form.

Thus, the description below relates to a transmission device 1 which, other than the shift element E, is basically designed in the same way as the transmission device 1 of FIG. 1, in which the shift element E is a frictional shift element. In the second version of the transmission device 1 the various gear ratio steps "1" to "9" for forward driving and the gear ratio "R" for reversing are engaged with the shift element E, preferably made as a claw-type shift element, in accordance with the shifting logic in the transmission device 1 shown in FIG. 2.

Figure 5:
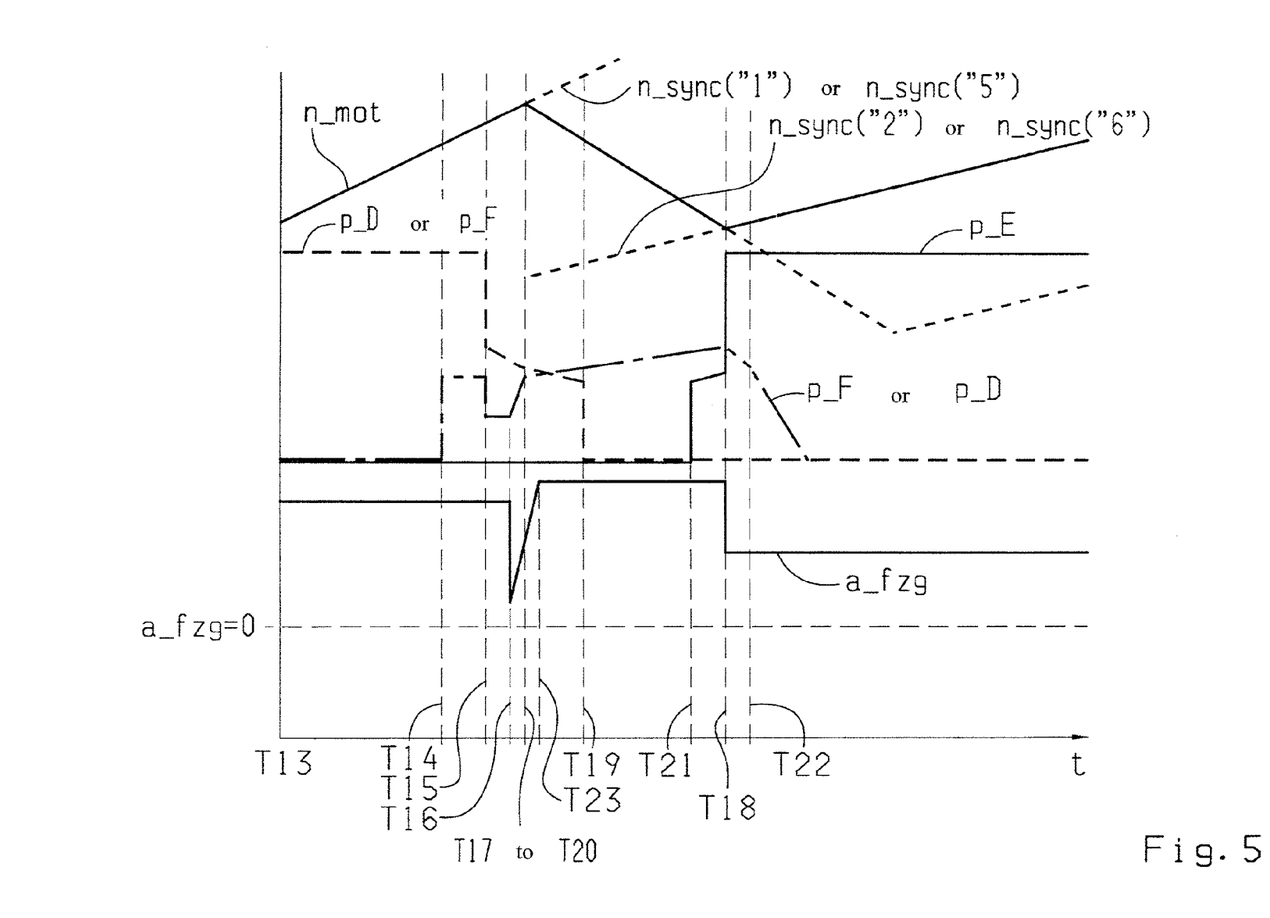
FIG. 5: Representation as in FIG. 3 of various operating parameter variations during an operating condition variation comprising a further shift, in a second embodiment of the transmission device different from that according to FIG. 1.

The variations of the various operating parameters shown in FIG. 5 take place during a traction upshift in the transmission device 1, when the interlocking shift element E is engaged in order to obtain the required target gear ratio in the transmission device 1.

Basically, the shift element E has to be engaged in the force flow of the transmission device 1 to obtain the second gear ratio "2", the sixth gear ratio "6" and the eighth gear ratio "8", and must be changed to or kept in an open operating condition to obtain the other gear ratios "1", "3" to "5", "7" and "9".

Furthermore, the variations shown in FIG. 5 are purely qualitative variations which characterize a traction upshift starting from a current gear ratio "1" to a target gear ratio "2" or from a current gear ratio "5" to a target gear ratio "6".

At a time T13 the first gear ratio step "1" or the fifth gear ratio step "5" is engaged in the transmission device 1. At a later time T14 a command is given for a traction upshift toward the target gear ratio "2" or "6", and to obtain the second gear ratio "2" the frictional shift element D must be disengaged and the interlocking shift element E engaged, whereas the two interlocking shift elements B and C are kept in the closed operating condition. If it is the sixth gear ratio "6" which is called for as the target gear of the traction upshift, the frictional shift element F must be disengaged and the interlocking shift element E has to be engaged in the force flow, whereas the interlocking shift element C and the frictional shift element A are kept in the closed condition.

Below, the further variant of the method according to the invention will be described in more detail, first while carrying out the traction upshift starting from first gear ratio step "1" toward the required second gear ratio "2".

At time T14, when the command for the traction upshift is received, the frictional shift element F, which while the first gear ratio step "1" is engaged is essentially in its open operating condition, is changed during a rapid-filling pulse that lasts until time T15 and during a filling adjustment phase following the rapid-filling pulse, that lasts until time T16, to an operating condition starting from which an increase of the actuating pressure p_F brings about an increase of the transmission capacity. The interlocking shift element E to be engaged is brought to an at least approximately synchronous condition by appropriately increasing the transmission capacity of the frictional shift element F.

For this, after time T16 the actuating pressure p_F of the frictional shift element F is increased to a first pressure value along a first pressure ramp that lasts until a further time T17 and, during a second pressure ramp subsequent to the first pressure ramp whose gradient is smaller that the first pressure ramp, it is increased further until a time T18.

At the same time the actuating pressure p_D of the frictional shift element D to be disengaged is reduced abruptly at time T15, and then reduced further in a controlled manner until a time T19 and then, at time T19, brought down completely to zero.

The lowering of the transmission capacity of the frictional shift element D and the simultaneous increase of the transmission capacity of the frictional shift element F result in a transmission input speed n_mot of the transmission device 1 at a time T20, which essentially corresponds to time T17, which changes starting from a speed equivalent to the synchronous speed n_sync("1") of the current gear ratio "1", toward a speed equivalent to a synchronous speed n_sync("2") of the target gear ratio "2", so that the transmission input speed n_mot corresponds essentially to the synchronous speed n_sync("2") in this case at time T18.

At a time T21 later than time T19 but earlier than time T18, the actuating pressure p_E of the interlocking shift element E to be engaged is raised to a first pressure value whereby the interlocking shift element E is essentially prepared for engagement. Then, the actuating pressure p_E of the interlocking shift element E is held essentially at the pressure level set at the time T21 until time T18. At time T18, at which the transmission input speed n_mot corresponds essentially to the synchronous speed n_sync("2") of the target gear ratio "2", the actuating pressure p_E of the interlocking shift element E is increased to the closing pressure level and the interlocking shift element E is closed.

Owing to the above-described actuation of the frictional shift element F, at time T18 the interlocking shift element E is essentially in its synchronous operating condition and can therefore easily be changed from its open to its closed condition. After time T18 the actuating pressure p_F of the frictional shift element F is reduced essentially down to zero, first along a first pressure ramp that lasts until a time T22 and then along a second pressure ramp with a larger gradient, whereupon the required traction upshift starting from the first gear ratio "1" in the direction toward the second gear ratio "2" can be regarded as having ended.

While the required traction upshift is being carried out, the variation of the vehicle's acceleration a_fzg shown in FIG. 5 takes place, which is at first substantially constant between times T13 and T15. At time T15 the vehicle's acceleration a_fzg falls abruptly and then increases again until a time T23.

The inconstancy in the variation of the vehicle's acceleration a_fzg results from the fact that the transmission capacity of the shift element D to be disengaged is already low at time T15, whereas the transmission capacity of the frictional shift element F provided for synchronizing the shift element E to be engaged does not yet transmit to the required extent the torque applied by a drive machine. At time T23 the partial load transfer in the area of the shift element F is completed, so the vehicle's acceleration a_fzg remains substantially constant until time T18. At time T18, when the interlocking shift element E to be engaged is closed, the vehicle's acceleration a_fzg falls to the level of the target gear ratio "2" and remains essentially constant.

When a traction upshift starting from the fifth gear ratio "5" toward the sixth gear ratio "6" has been called for, the further variant of the method according to the invention described in FIG. 5 provides that the frictional shift element F to be disengaged is actuated in the same manner as the frictional shift element D which is disengaged during a traction upshift starting from the first gear ratio "1" toward the second gear ratio "2". At the time the frictional shift element D, which is used for synchronizing the interlocking shift element E during a traction upshift from the fifth gear ratio "5" toward the sixth gear ratio "6", is actuated to the same extent as the frictional shift element F provided for synchronizing the interlocking shift element E during a traction upshift from the first gear ratio "1" to the second gear ratio "2".

By virtue of the further variant of the method according to the invention described by FIG. 5, with the transmission device 1 constructed with the interlocking shift element E traction upshifts can be carried out without traction force interruption and at the same time power losses due to drag torques can be farther reduced.

According to a variant of the method according to the invention, traction upshifts, during which at least one interlocking shift element has to be engaged, are begun as double upshifts or as multiple upshifts. As soon as the input speed reaches, respectively, the speed equivalent to the synchronous speed n_sync("2") or n_sync("6"), the interlocking shift element E to be closed is essentially in a synchronous operating condition and can then be changed to its closed operating condition easily and at a defined point in time. The transmission capacity of the frictional shift element F or D which respectively ensures the synchronization of the interlocking shift element E or the synchronization of the interlocking shift element E without traction force interruption, is essentially reduced again to zero or to a low value once the interlocking shift element E has been engaged.

Since high friction powers can sometimes occur in the area of the shift elements D and F respectively provided for synchronizing the interlocking shift element E, these can for example be provided with strategy-related cooling and/or appropriate transmission lubrication, and/or they can be made with high-performance friction linings.

In the variant procedure according to the invention interlocking shift elements are in each case only used to obtain up to the n_1th gear of a transmission device with n gear steps, since in all cases a frictional shift element that must be engaged for the rotational speed equalization or synchronization of the interlocking shift element to be engaged is used, in order to be able to carry out a traction upshift without traction force interruption.

In some circumstances, even if the highest possible driving gear or overdrive is not used, the procedure according to the invention leads to a reduction of the fuel consumption of a vehicle, namely if the fuel consumption reduction due to the reduction of drag torques in the area of the shift element alone, is larger than during operation in the additional overdrive mode.

INDEXES

1 Transmission device
2 Drive input shaft
3 Drive output shaft
"1" to "9" Gear ratio for forward driving
A to F Shift element
a_fzg Vehicle acceleration
"N" Neutral operating condition
n_mot Transmission input speed
n_sync Synchronization speed
nd_C Speed difference at the shift element C
p_A Actuating pressure
p_A1 Pressure level
p_B Actuating pressure
p_C Actuating pressure
p_D Actuating pressure
p_E Actuating pressure
p_F Actuating pressure
P1 to P4 Planetary gearset
"R" Gear ratio for reversing
T1 to T23 Discrete time points
t Time

The invention claimed is:

1. A method of operation of a transmission device (1) comprising a plurality of shiftable elements comprised of a plurality of frictional shift elements (A, D, E, F) and at least one interlocking shift element (B, C) for obtaining various gear ratios ("1" to "9", "R") such that, when a shift to a selected target gear ratio is called for, during which the at least one interlocking shift element (C) is changed from a disengaged to an engaged operating condition, the at least one interlocking shift element (C) is at least approximately synchronized by increasing a transmission capacity of at least a first frictional shift element (A), which is disengaged in force flow of the transmission device (1) in both of a current gear ratio and the selected target ratio, and in an approximately synchronized condition the interlocking shift element (C) is changed to an engaged operating condition, only three of the shiftable elements are engaged in each of the various gear ratios, the method comprising the steps of:
   initiating the shift to the selected target gear ratio;
   maintaining engagement, during the shift to the selected target gear, of one of the plurality of shiftable elements which is engaged in the current gear ratio in the force flow in the transmission device;
   increasing the transmission capacity of the first frictional shift element so as to at least approximately synchronize the at least one interlocking shift element;
   engaging the at least one interlocking shift element in the force flow of the transmission device when the at least one interlocking shift element is at least approximately synchronized;
   engaging a further frictional shift element (D), which produces the force flow in the transmission device (1), such that only three of the shiftable elements are engaged in the selected target gear ratio, the further frictional shift element being disengaged in the current gear ratio and engaged in the selected target gear ratio.

2. The method according to claim 1, further comprising the step of preparing the further frictional shift element (D) for engagement by appropriate pressure control of an actuating pressure of the further frictional shift element (D), already before an engagement time-point (T6) of the interlocking shift element (C).

3. The method according to claim 1, further comprising the step of before the synchronization of the at least one interlocking shift element (C) brought about by increasing a transmission capacity of the first frictional shift element (A), increasing a transmission capacity of at least another frictional shift element (E), which is not involved in either a synchronization process of the interlocking shift element (C) or in maintaining the current operating condition of the transmission device (1) nor in obtaining the gear ratio ("1") to be engaged, and braking a drive output actively connected to a transmission output (3) of a vehicle constructed with the transmission device (1).

4. The method according to claim 3, further comprising the step of braking the transmission output (3) that is actively connected to the drive output by increasing the transmission capacity of the another frictional shift element (E), during reverse driving of the vehicle comprising the transmission device (1) at a vehicle speed higher than a predefined threshold value, in a neutral operating condition (N) of the transmission device in which the force flow in the transmission device (1) is essentially interrupted, and when a command has been received to engage a gear ratio ("1") for forward driving in the transmission device (1), to obtain which the at least one interlocking shift element (C) has to be changed to the engaged operating condition.

5. The method according to claim 1, further comprising the step of at least approximately synchronizing and then engaging the at least one interlocking shift element (C) and, thereafter, the further frictional shift element (D) that produces the force flow in the transmission device (1) is engaged, when a vehicle comprising the transmission device (1) is driving forward at a vehicle speed lower than a predefined threshold value, in a neutral operating condition (N) of the transmission device (1) in which the force flow in the transmission device is essentially interrupted, and when a command is received to engage a gear ratio ("1") for forward driving in the transmission device (1), to obtain which the at least one interlocking shift element (C) has to be changed to the engaged operating condition, by increasing the transmission capacity of the first frictional shift element (A) whose transmission capacity, when the required gear ratio ("1") has been obtained, is substantially zero.

6. The method according to claim 5, further comprising the step of at least approximately synchronizing and then engaging the at least one interlocking shift element (C) when driving in reverse at a vehicle speed lower than a threshold value, by increasing the transmission capacity of the first frictional shift element (A), and
   engaging the further frictional shift element (D) that produces the force flow in the transmission device (1).

7. The method according to claim 1, further comprising the step of engaging the at least one interlocking shift element (E) when a command is received for a traction upshift to produce a required target gear ratio ("2" or "6"), and before being engaged the at least one interlocking shift element (E) is at least approximately synchronized by increasing the transmission capacity of at least one second frictional shift element (D or F) which disengaged in the force flow of the transmission device (1) in both of the current gear ratio and the selected target gear ratio.

8. The method according to claim 7, further comprising the step of reducing the transmission capacity of the second frictional shift element (D or F) engaged in order to obtain the current gear ratio ("1" or "5"), while the at least one interlocking shift element (E) to be engaged is brought to a closed operating condition when a transmission input speed (n_mot) corresponds at least approximately to a synchronous speed (n_sync("2") or n_sync("6")) equivalent to the selected target gear ratio ("2" or "6").

9. The method according to claim 7, further comprising the step of reducing the transmission capacity of the second frictional shift element (D or F) engaged in the force flow in order to obtain the current gear ratio ("1" or "5") when the second frictional shift element (F or D) provided for synchronizing the at least one interlocking shift element (E) to be engaged is at least nearly prepared for increasing its transmission capacity, when the command is received for the traction upshift from the current gear ratio ("1" to "5") toward the target gear ratio ("2" or "6").

10. The method according to claim 7, further comprising the step of reducing the transmission capacity of the second frictional shift element (D or F), which is engaged in order to obtain the current gear ratio ("1" or "5"), at least approximately to zero, when a transmission input speed (n_mot) is changed by virtue of the transmission capacity of the second frictional shift element (F or D) provided for synchronizing the at least one interlocking shift element (E) to be engaged, from a speed (n_sync("1") or n_sync("5")) equivalent to the current gear ratio ("1" or "5") toward a speed (n_sync("2") or n_sync("6")) equivalent to the target gear ratio ("2" or "6").

11. A method of shifting a transmission device (1) from a current gear ratio to a selected target gear ratios ("1"-"9", "R"), the transmission device (1) comprising a plurality of shiftable elements (A, B, C, D, E, F) including a plurality of frictional shift elements (A, D, E, F) and at least one interlocking shift element (B, C), and only three of the plurality of shiftable elements (A, B, C, D, E, F) being engaged in each of the current gear ratio and the selected target gear ratios ("1"-"9"), each of the current gear ratio and the selected target gear ratios being defined by the only three shiftable elements engaged, the method comprising the steps of:
   maintaining engagement of one of the plurality of shiftable elements which was previously engaged in the current gear ratio;
   increasing a torque transmission capacity of a first frictional shift element (A) to synchronize the at least one interlocking shift element (C), the first frictional shift element (A) being one of the plurality of shift elements (A, B, C, D, E, F) that is disengaged in a flow of force through the transmission device (1) in current gear ratio and the selected target gear ratio;

engaging the at least one interlocking shift element (C) upon synchronization thereof;

disengaging the first frictional shift element;

increasing an actuating pressure of a second frictional shift element (D) to produce the flow of force through the transmission device (1), the second frictional shift element is disengaged in the current gear ratio and engaged in the selected target gear ratio; and engaging the second frictional shift element (D) to implement and define the selected target gear ratio ("1"-"9").

12. A method of shifting a transmission device (1) from a current gear ratio to a target gear ratio of a plurality of drive gear ratios ("1"-"9", "R"), the transmission device (1) comprising a plurality of shiftable elements (A, B, C, D, E, F) including first, second, third and fourth frictional shift elements (A, D, E, F) and first and second interlocking shift elements (B, C), and only three of the plurality of shiftable elements (A, B, C, D, E, F) being engaged in each of the plurality of drive gear ratios ("1"-"9"), each of the plurality of the drive gear ratios is defined by the only three shiftable elements that are engaged in the respective drive gear ratio, the method comprising the steps of:

maintaining engagement of one of the plurality of shiftable elements that was engaged in the current gear ratio;

increasing a torque transmission capacity of the first frictional shift element (A) to synchronize the first interlocking shift element (C), the first frictional shift element (A) being one of the plurality of shift elements (A, B, C, D, E, F) that is disengaged in a flow of force through the transmission device (1) in both of the current gear ratio of the transmission device (1) and the target gear ratio;

engaging the first interlocking shift element (C) upon synchronization thereof and reducing the torque transmission capacity of the first frictional shift element;

increasing an actuating pressure of the second frictional shift element (D) to produce the flow of force through the transmission device (1), the second frictional shift element is disengaged in the current gear ratio and engaged in the selected target gear ratio; and engaging the second frictional shift element (D) to implement the target gear ratio ("1"-"9").

* * * * *